United States Patent
Mårtensson et al.

(12) 
(10) Patent No.: US 6,369,129 B1
(45) Date of Patent: Apr. 9, 2002

(54) INSULATING COMPOSITION FOR AN ELECTRIC POWER CABLE

(75) Inventors: Hans Mårtensson, Stenungsund (SE); Merja Poikela, Espoo; Anders Nymark, Porvoo, both of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/609,236

(22) Filed: Jun. 30, 2000

Related U.S. Application Data

(63) Continuation of application No. PCT/SE98/02412, filed on Dec. 22, 1998.

(51) Int. Cl.$^7$ .................. H02G 15/00; C08F 210/00
(52) U.S. Cl. .................. 523/173; 526/348; 526/348.2
(58) Field of Search .................. 523/173; 526/348, 526/348.2

(56) References Cited

FOREIGN PATENT DOCUMENTS

| EP | 0 022 376 | 1/1981 |
|---|---|---|
| EP | 0 040 992 | 12/1981 |
| EP | 0 041 796 | 12/1981 |
| WO | WO 92/12182 | 7/1992 |
| WO | WO 93/04486 | 4/1993 |
| WO | WO 97/49764 | 12/1997 |
| WO | WO 97/50093 | 12/1997 |

*Primary Examiner*—Edward J. Cain
(74) *Attorney, Agent, or Firm*—Merchant & Gould P.C.

(57) ABSTRACT

An insulating composition for an electric power cable, and an electric power cable comprising a conductor surrounded by an inner semiconducting layer, an insulating layer, and an outer semiconducting layer, where the insulating layer consists of said insulating composition, are disclosed. The insulating composition comprises a crosslinkable multimodal ethylene copolymer obtained by coordinating catalysed polymerization of ethylene and at least one alpha-olefin, and has a density of 0.890–0.940 g/cm$^3$ and an MFR$_2$ of 0.1–10 g/10 min. The insulating composition is characterized in that the ethylene copolymer has an MWD of 3–12, a melting temperature of at most 125° C., and a viscosity of 2500–7000 Pa.s at 135° C. and a shear rate of 10 s$^{-1}$, 1000–1800 Pa.s at 135° C. and a shear rate of 100 s$^{-1}$, and 250–400 Pa.s at 135° C. and a shear rate of 1000 s$^{-1}$, and that the multimodal ethylene copolymer includes an ethylene copolymer fraction selected from (a) a low molecular weight ethylene copolymer having a density of 0.900–0.950 g/cm$^3$ and an MFR$_2$ of 25–300 g/10 min and (b) a high molecular weight ethylene copolymer having a density of 0.870–0.940 g/cm$^3$ and an MFR$_2$ of 0.01–3 g/10 min.

10 Claims, No Drawings

INSULATING COMPOSITION FOR AN ELECTRIC POWER CABLE

This application is a continuation of international application number PCT/SE98/02412, filed Dec. 22, 1998.

FIELD OF THE INVENTION

The present invention relates to an insulating composition for an electric power cable which comprises a crosslinkable ethylene polymer. The present invention also relates to an electric power cable comprising a conductor surrounded by an inner semiconducting layer, an insulating layer, and an outer semiconducting layer.

BACKGROUND OF THE INVENTION

Electric power cables for medium voltages (6–69 kV) and high voltages (>69 kV) normally include one or more metal conductors surrounded by an insulating material like a polymer material, such as an ethylene polymer. In power cables the electric conductor is usually coated first with an inner semiconducting layer followed by an insulating layer, then an outer semiconducting layer followed by water barrier layers, if any, and on the outside a sheath layer. The layers of the cable are based on different types of ethylene polymers which usually are crosslinked.

LDPE (low density polyethylene), i.e. polyethylene prepared by radical polymerisation at a high pressure and crosslinked by adding a peroxide in connection with the extrusion of the cable, is today the predominant cable insulating material. Radical polymerization results in long chain branched polymers having a relatively broad molecular weight distribution (MWD). This in turn results in desirable rheological properties with regard to their application as insulating materials for electric power cables.

A limitation with LDPE lies in the fact that it is made by radial polymerisation. Radical polymerisation of ethylene is carried out at high temperatures of up to about 300° C. and at high pressures of about 100–300 MPa. To generate the high pressures needed energy consuming compressors are required. Considerable investment costs are also required for the polymerisation apparatus which must be able to resist the high pressures and temperatures of radical initiated high pressure polymerisation.

With regard to insulating compositions for electric power cables it would be desirable both from a technical and an economical point of view if it was possible to make an ethylene polymer with the advantageous properties of LDPE, but which was not made by radical polymerisation. This would mean that insulation for electric cables could be made not only at plants for high pressure polymerisation of ethylene, but also at the many existing plants for low pressure polymerisation of ethylene. In order to be a satisfactory replacement for LDPE such a low pressure material would have to fulfil a number of requirements for insulating materials, such as good processability, high dielectric strength and good crosslinking properties. It has turned out, though, that for various reasons existing low pressure materials are not suitable as replacement for LDPE as insulating material for electric cables.

Thus, conventional high density polyethylene (HDPE) produced by polymerisation with a coordination catalyst of Ziegler-Natta type at low pressure has a melting point of about 130–133° C. When a HDPE is processed in an extruder the temperature should lie above the melting point of 130–135° C. to achieve good processing. This temperature lies above the decomposition temperature of the peroxides used for the crosslinking of insulating ethylene polymer compositions. Dicumyl peroxide e.g. which is the most frequently used crosslinking peroxide starts to decompose at a temperature of about 135° C. Therefore, when HDPE is processed above its melting temperature in an extruder the crosslinking peroxide decomposes and prematurely crosslinks the polymer composition, a phenomenon referred to as "scorching". If, on the other hand the temperature is kept below the decomposition temperature of the peroxide then the HDPE will not melt adequately and unsatisfactorily processing will result.

Further, ethylene copolymers made by polymerisation with a coordination catalyst at low pressure, like linear low density polyethylene (LLDPE) are unsuitable due to poor processability. The processability may be improved by polymerising the LLDPE in two or more steps (bimodal or multimodal LLDPE), but such LLDPE includes high melting HDPE fractions or components, particularly when the polymerisation is carried out with conventional Ziegler-Natta catalysts, which makes LLDPE unsuitable for the same reason as conventional HDPE.

In this connection WO 93/04486 discloses an electrically conductive device having an electrically conductive member comprising at least one electrically insulating member. The insulating member comprises an ethylene copolymer with a density of 0.86–0.96 g/cm$^3$, a melt index of 0.2–100 dg/min, a molecular weight distribution of 1.5–30, and a composition distribution breadth index (CDBI) greater than 45%. The copolymer of this reference is unimodal as opposed to multimodal.

WO 97/50093 relates to a cable comprising one or more electrical conductors surrounded by an insulating layer of a multimodal copolymer of ethylene and one or more $C_3$–$C_8$ alpha-olefins. The copolymer has a broad comonomer distribution as measured by Temperatures Rising Eluation Fractionation (TREF) with a value for the percent of copolymer, which elutes out at a temperature of grater than 90° C., of greater than about 5%; a Water Tree Growth Rate (WTGR) value of less than abut 20%; a melt index in the range of about 0.1 to about 30 g/10 min; and a density in the range of 0.880–0.950 g/cm$^3$, and is prepared by a low pressure process.

In view of the above it would be an advantage if it was possible to replace crosslinkable LDPE made by radical initiated polymerisation as a material for the insulating layer of electric power cables by an ethylene polymer made by coordination catalysed low pressure polymerisation. Such a replacement polymer should have rheological properties, including processability similar to those of LDPE. Further, it should have a low enough melting temperature to be completely melted at 125° C. in order to avoid "scorch" due to premature decomposition of the crosslinked peroxide.

SUMMARY OF THE INVENTION

It has now been discovered that LDPE may be replaced as a crosslinkable material for the insulation type layer of electric cables by a crosslinkable ethylene copolymer made by coordination catalysed low pressure polymerisation with ethylene copolymer is a multimodal ethylene copolymer with specified density and viscosity and with melting temperature of at most 125° C.

More particularly the present invention provides an insulating composition for an electric power cable which comprises a crosslinkable, multimodal ethylene copolymer obtained by coordination catalysed polymerisation of ethylene and at least one other alpha-olefin, said multimodal ethylene copolymer having a density of 0.890–0.940 g/cm³ and an $MFR_2$ of 0.1–10 g/10 min, characterised in that the ethylene polymer has an MWD of 3–12, a melting temperature of at most 125° C., and a viscosity of 2500–7000 Pa.s at 135° C. and a shear rate of 10 s⁻¹, 1000–1800 Pa.s at 135° C. and a shear rate of 100 s⁻¹, and 250–400 Pa.s at 135° C. and a shear rate of 1000 s⁻¹, said multimodal ethylene copolymer including an ethylene copolymer fraction selected from (a) a low molecular weight ethylene copolymer having a density of 0.900–0.950 g/cm³ and an $MFR_2$ of 25–300 g/10 min, and (b) a high molecular weight ethylene copolymer having a density of 0.870–0.940 g/cm³ and an $MFR_2$ of 0.01–3 g/10 min.

A density in the lower part of the range, i.e. 0.890–0.910 g/cm³ is aimed at when a very flexible cable is desired. Such cables are suitable for applications in cars, mines and the building industry. These low densities are only possible to reach by using a single-site type catalyst, at least for the higher molecular weight fraction. When densities in the range 0.910–0.940 g/cm³ are chosen, the resulting cables are stiffer, but have better mechanical strength values, and are therefore more suitable for non-flexible power supply cables.

The present invention also provides an electric power cable comprising a conductor surrounded by an inner semiconducting layer, an insulating layer, and an outer semiconducting layer, said insulating layer comprising a crosslinked multimodal ethylene copolymer obtained by coordination catalysed polymerisation of ethylene and at least one other alpha-olefin and having a density of 0.890–0.940 g/cm³ and an $MFR_2$ of 0.1–10 g/10 min, characterised in that the multimodal ethylene copolymer of the insulating layer has an MWD of 3–12, a melting temperature of at most 125° C., and a viscosity of 2500–7000 Pa.s at 135° C. and a shear rate of 10 s⁻¹, 1000–1800 Pa.s at 135° C. and a shear rate of 100 s⁻¹, and 250–400 Pa.s at 135° C. and a shear rate of 1000 s⁻¹, said multimodal ethylene copolymer including an ethylene copolymer fraction selected from (a) a low molecular weight ethylene copolymer having a density of 0.900–0.950 g/cm³ and an $MFR_2$ of 25–300 g/10 min, and (b) a high molecular weight ethylene copolymer having a density of 0.870–0.940 g/cm³ and an $MFR_2$ of 0.01–3 g/10 min.

These and other characteristics of the invention will appear from the appended claims and the following description.

DETAILED DESCRIPTION OF THE INVENTION

Before the invention is described in more detail, some key expressions will be defined.

By the "modality" of a polymer is meant the structure of the molecular-weight distribution of the polymer, i.e. the appearance of the curve indicating the number of molecules as a function of the molecular weight. If the curve exhibits one maximum, the polymer is referred to as "unimodal", whereas if the curve exhibits a very broad maximum or two or more maxima and the polymer consists of two or more fractions, the polymer is referred to as "bimodal", "multimodal" etc. In the following, all polymers which consist of at least two fractions and the molecular-weight-distribution curves of which are very broad or have more than one maximum are jointly referred to as "multimodal".

By the expression "melt flow rate" (MFR) used herein is meant, unless otherwise stated, the melt flow rate of a polymer as determined in accordance with ISO 1133, condition 4 ($MFR_2$). The melt flow rate, when is indicated in g/10 min, is an indication of the flowability, and hence the processability, of the polymer. The higher the melt flow rate, the lower the viscosity of the polymer.

The expression "coordination catalyst" encompasses catalysts of the Ziegler-Natta type and single site catalysts, such as e.g. single-site catalysts.

The "molecular weight distribution" (MWD) of a polymer means its molecular weight distribution as determined by the ratio between the weight average molecular weight ($M_w$) and the number average molecular weight ($M_n$) of the polymer ($M_w/M_n$).

It is previously known to produce multimodal, in particular bimodal, olefin polymers, preferably multimodal ethylene plastics, in two or more reactors connected in series. As instances of this prior art, mention may be made of EP 040 992, EP 041 796, EP 022 376 and WO 92/12182, which are hereby incorporated by way of reference as regards the production of multimodal polymers. According to these references, each and every one of the polymerisation stages can be carried out in liquid phase, slurry or gas phase.

According to the present invention, the main polymerisation stages are preferably carried out as a combination of slurry polymerisation/gas-phase polymerisation or gas-phase polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition, a flexible method is required. For this reason, it is preferred that the composition is produced in two main polymerisation stages in a combination of loop reactor/gas-phase reactor or gas-phase reactor/gas-phase reactor. It is especially preferred that the composition is produced in two main polymerisation stages, in which case the first stage is performed as slurry polymerisation in a loop reactor and the second stage is performed as gas-phase polymerisation in a gas-phase reactor. Optionally, the main polymerisation stages may be preceded by a prepolymerization, in which case up to 20% by weight, preferably 1–10% by weight, of the total amount of polymers is produced. Generally, this technique results in a multimodal polymer through polymerisation with the aid of a single-site or Ziegler-Natta catalyst in several successive polymerisation reactors.

Alternatively, a multimodal polymer may be produced through polymerisation in one single polymerisation reactor with the aid of a dual site coordination catalyst or a blend of different coordination catalysts, such as a Ziegler-Natta catalyst and a single-site catalyst or two different Ziegler-Natta catalysts. It is preferred, though, that the polymerisation be carried out in two or more polymerisation reactors connected in series.

In the production of a bimodal ethylene copolymer, a first ethylene copolymer fraction is produced in a first reactor under certain conditions with respect to monomer composition, hydrogen-gas pressure, temperature, pressure, and so forth. After the polymerisation in the first reactor, the reaction mixture including the copolymer fraction produced is fed to a second reactor, where further polymerisation takes place under other conditions. Usually, a first copolymer fraction of high melt flow rate (low molecular weight) and with an addition of comonomer, as produced in the first reactor, whereas a second copolymer fraction of low melt flow rate (high molecular weight) and with an addition of comonomer is produced in the second reactor. As comonomer, use is preferably made of α-olefin having up to 8 carbon atoms, such as propene, 1-butene, 4-methyl-1 pentene, 1-hexene, and 1-octene. The resulting end product consists of an intimate mixture of the copolymers from the two reactors, the different molecular-weight-distribution curves of these copolymers together forming a molecular-weight-distribution curve having one broad maximum or two maxima, i.e. the end product is a bimodal polymer mixture. Since multimodal, and especially bimodal polymers, and the production thereof belong to the prior art, no further detailed description is called for here, but reference is made to the above specifications.

It should here be pointed out that, in the production of two or more polymer components in a corresponding number of reactors connected in series, it is only in the case of the component produced in the first reactor stage and in the case of the end product that the melt flow rate, the density and the other properties can be measured directly on the material removed. The corresponding properties of the polymer components produced in reactor stages following the first stage can only be indirectly determined on the basis of the corresponding values of the materials introduced into and discharged from the respective reactor stages.

Even though multimodal polymers and their production are known per se, it is not previously known to prepare multimodal copolymers having the specific characteristics defined above and use them as insulating layers for electric power cables.

As hinted above, it is preferred that the multimodal olefin copolymer in the cable-insulating composition according to the invention is a bimodal ethylene-copolymer. It is also preferred that this bimodal ethylene copolymer has been produced by polymerisation as above under different polymerisation conditions in two or more polymerisation reactors connected in series. Owing to the flexibility with respect to reaction conditions thus obtained, it is preferred that the polymerisation is carried out in a loop reactor/a gas-phase reactor, a gas-phase reactor/a gas-phase reactor or a loop reactor/a loop reactor. The polymerisation conditions in the preferred two-stage method are so chosen that a comparatively low molecular weight ethylene copolymer is produced in one stage, preferably the first stage, owing to a high content of chain-transfer agent (hydrogen gas), whereas a high molecular weight ethylene copolymer is produced in another stage, preferably the second stage. The order of these stages may, however, be reversed.

As mentioned above, the multimodal ethylene copolymer of the invention should have a density of 0.890–0.940 g/cm$^3$.

Further, the comonomer content of the multimodal ethylene copolymer of the invention should lie within the range 2–22% by weight based on the copolymer. As the density of the copolymer is related to the comonomer content and is roughly inversely proportional to the comonomer content, this means that the lower density of 0.890 g/cm$^3$ corresponds to the higher comonomer content of 18–22% by weight, the lower value valid for a single-site catalyzed material and the higher for a Ziegler-Natta catalyzed, whereas the higher density of 0.940 g/cm$^3$ corresponds to the lower comonomer content of 2% by weight.

As stated earlier, the comonomer of the ethylene copolymer of the present invention is selected from other alpha-olefins, preferably other $C_3$–$C_8$ alpha-olefins. It is particularly preferred that the comonomer is selected from at least one member of the group consisting of propylene, 1-butene, 4-methyl-1-pentene, 1-hexene, and 1-octene.

It is an essential characteristic of the multimodal ethylene copolymer of the present invention that is has a melting temperature ($T_m$) of at most 125° C. Preferably, the multimodal ethylene copolymer as well as its ethylene copolymer fractions should have a melting temperature of at most 125° C. The expression "an ethylene copolymer fraction" refers to one of the at least two polymer fractions constituting the multimodal ethylene copolymer.

Another essential characteristic of the multimodal ethylene copolymer of the present invention is that its processing properties are similar in those of LDPE. More particularly, the multimodal ethylene copolymer of the invention has a viscosity of 2500–7000 Pa.s of 135° C. and a shear rate of 10 s$^{-1}$,
1000–1800 Pa.s of 135° C. and a shear rate of 100 s$^{-1}$, and
250–400 Pa.s at 135° C. and a shear rate of 1000 s$^{-1}$.
Preferably, the viscosity is as follows:
4000–7000 Pa.s at 135° C. and a shear rate of 10 s$^{-1}$,
1000–1500 Pa.s at 135° C. and a shear rate of 100 s$^{-1}$, and
300–350 Pa.s at 135° C. and a shear rate of 1000 s$^{-1}$.

The above viscosity values illustrate the processing behaviour of the multimodal ethylene copolymer of the invention very well. Further, the viscosity of the multimodal ethylene copolymer determined by its melt flow rate, $MFR_2$, should lie in the range 0.1–10.0, preferably 1.0–7.0 g/10 min.

The multimodal ethylene copolymer of the invention has a molecular weight distribution, MWD, of 3–12, preferably 4–10, more preferably 4–8.

In order to be crosslinkable the multimodal ethylene copolymer of the present invention should have a degree of unsaturation of at least about 0.3–0.6 double bonds/1000 carbon atoms.

The multimodal ethylene copolymer is made up of at least two ethylene copolymer fractions and the properties of the individual copolymer fractions should be so chosen that the above specified values of density/comonomer content, viscosity/melt flow rate, MWD and melting temperature of the multimodal ethylene copolymer are achieved.

Although the multimodal ethylene copolymer of the invention could in principle consist of a polymerised blend of any number of ethylene copolymer fractions, it is preferred that it consists of two ethylene copolymer fractions only, namely a low molecular weight (LMW) ethylene copolymer fraction and a high(er) molecular weight (HMW) ethylene copolymer fraction.

The preferred multimodal ethylene copolymer of the invention is thus obtained by a two-stage polymerisation process, where a LMW ethylene copolymer fraction is produced in the first polymerisation stage and a HMW ethylene copolymer fraction is produced in the second polymerisation stage. Preferably for use in non-flexible power supply cable, the LMW ethylene copolymer fraction has a density of 0.925–0.940 g/cm$^3$, and a $MFR_2$ of 25–300, preferably 40–200, more preferably 50–100 g/10 min. For use in flexible applications the density should preferably lie in the range of 0.900–0.925 g/cm$^3$. The comonomer content of the MW ethylene copolymer fraction is preferably 3–15% by weight. The HWM ethylene copolymer fraction has such a density, comonomer content, and MFR that the multimodal ethylene copolymer obtains the values of density/comonomer content, viscosity/melt flow rate, MWD and melting temperature specified above.

For use in flexible cable, it is preferred that the LMW fraction has a lower density of 0.900–0.925 g/cm$^3$ but similar $MFR_2$-values as for non-flexible cable applications.

More particularly, a calculation indicates that when the LMW ethylene copolymer has the above specified values, the HMW ethylene copolymer produced in the second polymerisation stage of a two stage process should have a density of 0.870–0.910 g/cm³ for flexible cable and of 0.910–0.940 g/cm³ for non-flexible cable, and a $MFR_2$ of 0.01–3, preferably 0.1–2.0 g/10 min. Preferably the comonomer content is 20–50% by weight in flexible compositions and 18 2% by weight in non-flexible ones.

As stated in the foregoing, the order of the polymerisation stages may be reversed, which would mean that, if the multimodal ethylene copolymer has a density and a viscosity as defined above, and the HWM ethylene copolymer produced in the first polymerisation stage has a density of 0.910–0.940 g/cm³ for non-flexible applications and 0.870–0.910 g/cm³ for flexible ones, and a $MFR_2$ of 0.01–3 g/10 min, then the LMW ethylene copolymers produced in the second polymerisation stage of a two-stage process should, according to calculations as above, have a density of 0.920–0.950 g/cm³ for non-flexible compositions and of 0.900–0.930 g/cm³ for flexible ones, and a $MFR_2$ of 25–300 g/10 min. This order of the stages in the production of the multimodal ethylene copolymer according to the invention is, however, less preferred.

In the multimodal ethylene copolymer of the invention the LWM ethylene copolymer fraction preferably comprises 30–60% by weight of the multimodal ethylene copolymer and, correspondingly, the HMW ethylene copolymer fraction comprises 70–40% by weight.

Besides the multimodal ethylene copolymer and a crosslinking agent the insulating composition of the present invention may include various additives commonly employed in polyolefin compositions, such as antioxidants, processing aids, metal deactivators, pigments, dyes, colourants, oil extenders, stabilisers, and lubricants.

In order to further illustrate the present invention and facilitate its understanding some non-restricting Examples are given below.

EXAMPLES 1–6

For the polymerisation of ethylene a loop reactor and a gas-phase reactor connected in series were used. In addition to ethylene 1-butene (Example 6) or 1-hexene (Examples 1–5) was used as a comonomer in the loop reactor and the gas-phase reactor. Hydrogen was used as a modifier. The catalyst was a single site catalyst of single-site type and was added to the loop reactor. Propane was used as a reaction medium in the loop reactor. The gaseous components of the product from the loop reactor were removed in a flash tank, whereafter the product was transferred to the gas-phase reactor where the polymerisation was continued. The polymerisation conditions and the product properties are shown in Table 1.

TABLE 1

|  | Example | | | | | |
|---|---|---|---|---|---|---|
|  | 1 | 2 | 3 | 4 | 5 | 6 |
| First reactor (PR1) | | | | | | |
| Temperature (° C.) | 80 | 80 | 80 | 80 | 70 | 85 |
| Pressure (MPa) | 2.1 | 2.1 | 2.0 | 2.0 | 1.8 | 6.4 |
| Ethylene partial pressure (MPa) | 0.8 | 0.8 | 0.7 | 0.7 | 1.4 | 0.47 |
| Hydrogen concentration (mol/kmol $C_2$) | 4.4 | 1.0 | 1.0 | 4.6 | — | 2 |
| Comonomer concentration (mol/kmol $C_2$) | 36 | 56 | 33 | 33 | 17 | 115 |
| Product density (g/cm³) |  |  |  |  | 0.932 | 0.935 |
| $MFR_{21}$ (g/10 min) |  |  |  |  | 45 | 54 |
| Second reactor (PR2) | | | | | | |
| Temperature (° C.) | 80 | 80 | 80 | 80 | 80 | 75 |
| Pressure (MPa) | 1.0 | 1.1 | 1.1 | 1.1 | 1.8 | 2.0 |
| Ethylene concentration (MPa) | 0.8 | 1.0 | 0.9 | 0.9 | 1.5 | 0.48 |
| Hydrogen concentration (mol/kmol $C_2$) | 1.0 | 4.4 | 4.4 | 0.9 | 8.4 | — |
| Comonomer concentration (mol/kmol $C_2$) | 56 | 36 | 36 | 45 | 24 | 36 |
| Split (product ratio PR1:PR2) | 48:52 | 70:30 | 60:40 | 40:60 | 62:38 | 44:56 |
| End product | | | | | | |
| Product density (g/cm³) | 0.928 | 0.926 | 0.929 | 0.919 | 0.938 | 0.930 |
| $MFR_2$ (g/10 min) | 6.0 | 2.4 | 3.7 | 2.5 | 9.0 | 3.2 |
| MWD | 4.7 | 4.8 | 5.4 | 3.4 | 11 | 5.5 |
| Melting temperature (° C.) | 122 | 125 | 121 | 120 | 124 | 119 |
| Comonomer content (% by weight) | 6.7 | 5.9 | 6.3 | 8.3 | 5.6 | 5.1 |
| Degree of unsaturation (C=C/1000 C.) | 0.47 | 0.52 | 0.47 | 0.39 | 0.50 | 0.24 |
| Viscosity at 135° C. (Pa · s) | | | | | | |
| Shear rate: 10 s⁻¹ | 3890 | 6800 | 5205 | 6920 | 2985 | 5880 |
| Shear rate: 100 s⁻¹ | 1460 | 1680 | 1572 | 1620 | 1260 | 1600 |
| Shear rate: 1000 s⁻¹ | 310 | 360 | 328 | 342 | 278 | 328 |

The bimodal ethylene copolymers of examples 1–6 were compounded with about 2% by weight of dicumyl peroxide as crosslinking agent and conventional stabilizers and extruded as an insulating layer of an electric power cable. No problems with scorch were experienced at the extrusion.

Evaluation of the electrical properties of the insulating compositions were also made. The electrical breakdown strength (Eb) at 50 Hz and 23° C. according to IEC 243 was determined as well as the dissipation factor (tan δ) and the relative permittivity ($\epsilon_r$) at 50 Hz and 23° C. according to IEC 250. For determination of the breakdown strength pressmoulded plaques were used which had a thickness of 0.20 mm and had been degassed at 70° C., 10 mbar for 24 h. The measurements were carried out with 25 mm diameter electrodes and a 2.0 kV/s rise-rate. Determination of the dissipation factor and the relative permittivity was carried out on 3.0 mm thick pressmoulded plaques at 500 V, both directly after pressmoulding and after 3 days at 90° C. The results are shown in Table 2.

TABLE 2

| Example | Eb (kV/mm) | tan δ ($10^{-4}$) Not degassed | Degassed | $\epsilon_r$ Not degassed | Degassed |
|---|---|---|---|---|---|
| 1 | 89.7 | 1.3 | 0.6 | 2.20 | 2.18 |
| 2 | 88.5 | 1.5 | 0.8 | 2.32 | 2.29 |
| 3 | 89.5 | 1.2 | 0.7 | 2.23 | 2.23 |
| 4 | 86.2 | 0.9 | 0.4 | 2.18 | 2.16 |
| 5 | 91.0 | 1.3 | 0.7 | 2.25 | 2.23 |
| 6 | 90.1 | 0.5 | 0.2 | 2.10 | 2.10 |

It is evident from Table 1 and 2 that the insulating composition according to the present invention has excellent rheological and electrical properties that are equal to or even better than those of conventional LDPE.

EXAMPLE 7

In this example a bimodal ethylene copolymer was prepared by polymerisation in two stages in two gas-phase reactors connected in series. The comonomer was 1-hexene in both stages and hydrogen was used as a modifier. The catalyst was a single site type single-site catalyst. The polymerisation conditions and the product properties are shown in Table 3. After compounding the copolymer with 0.2% by weight of Santonox R (stabilizer) and adding 2.1% by weight of dicumyl peroxide (crosslinking agent) the electrical properties of the insulating composition were evaluated as described in connection with Examples 1–6. The results are shown in Table 4 together with the values for conventional LDPE.

TABLE 3

| First reactor (PR1) | |
|---|---|
| Temperature (° C.) | 70 |
| Pressure (MPa) | 1.4 |
| Ethylene concentration (mole %) | 98 |
| Hydrogon concentration (mole %) | — |
| 1-hexene concentration (mole %) | 2 |
| Product density (g/cm³) | 0.924 |
| MFR$_{21}$ (g/10 min) | 40 |
| Second reactor (PR2) | |
| Temperature (° C.) | 80 |
| Pressure (MPa) | 1.5 |
| Ethylene concentration (mole %) | 97.0 |
| Hydrogen concentration (mole %) | 0.7 |
| 1-hexene concentration (mole %) | 2.3 |
| Split (product ration PR1:PR2) | 62:38 |
| End product | |
| Product density (g/cm³) | 0.935 |
| MFR$_2$ (g/10 min) | 6.6 |
| MWD | 11.3 |
| Melting temperature (° C.) | 123 |
| Comonomer content (% by weight) | 6.0 |
| Degree of unsaturation (C=C/1000C) | 0.47 |
| Apparent viscosity (Pa.s) at 135° C. | |
| Shear rate: 10 s$^{-1}$ | 3109 |
| Shear rate: 100 s$^{-1}$ | 1487 |
| Shear rate: 1000 s$^{-1}$ | 299 |

TABLE 4

| Example | Eb (kV/mm) | tan δ ($10^{-4}$) Not degassed | Degassed | $\epsilon_r$ Not degassed | Degassed |
|---|---|---|---|---|---|
| 7 | 91.9 | 0.5 | 0.2 | 2.21 | 2.11 |
| LDPE | 87.1 | 2.8 | 3.2 | 2.30 | 2.24 |

It is evident from Table 4 that insulating composition according to this example has excellent electrical properties that are even better than those of conventional LDPE.

The crosslinking properties of the insulating composition were evaluated by the hot set test. In this test, the elongation of dumbbells was measured at 200° C. with a load of 0.2 MPa. Decaline extraction was performed according to ASTM D 2765. The results are given in Table 5.

Table 5 also shows the results of scorch-testing. The measurements were performed on a Brabender Plasticorder PL 2000-6 at 5 rpm at 135° C. The oil heated kneader 350, 287 cm³ with walzenkneaders W7646 was used. The time to increase the torque value by 10 nM ($T_{10}$) from the minimum value ($F_{min}$) was measured.

TABLE 5

| | |
|---|---|
| Elongation/Sot (%/%) | 43.0 |
| Gel content (%) | 66.5 |
| Scorch $T_{10}$ min | 50 |
| Scorch $F_{min}$ (nm) | 29 |

It is evident from Table 5 that the insulating composition according to this example has a good scorch performance. The $T_{10}$ time of 58 min should be composed with about 56 min for conventional crosslinkable LDPE. Also, the hot set elongation was good.

EXAMPLE 8

For the polymerisation of ethylene a loop reactor and a gas-phase reactor connected in series were used together with a prepolymerisation reactor (Pre PR). In addition to ethylene 1-butene was used as a comonomer in the loop reactor and the gas-phase reactor. Hydrogen was used as a modifier. The catalyst was a catalyst of Ziegler-Natta type and was added to the prepolymerisation reactor. Propane was used as a reaction medium in the loop reactor. The gaseous components of the product from the loop reactor were removed in a flash tank, whereafter the product was transferred to the gas-phase reactor where the polymerisation was continued. The polymerisation conditions and the product properties are shown i Table 6.

After compounding the copolymer with 0.2% by weight of Santonox R (a stabiliser), 1% by weight of Irganox B561 (=Irganox 1010–Irgafos 168; weight ratio 1:4) and adding 2.1% by weight of dicumyl peroxide (crosslinking agent) the crosslinking properties of the insulating composition were evaluated by the hot set test. In this test, the elongation of dumbbells was measured at 200° C. with a load of 0.2 MPa. Decaline extraction was performed according to ASTM D 2765. The results are given in Table 7.

Table 7 also shows the results of scorch-testing. The measurements were performed on a Brabender Plasticorder PL 2000-6 at 5 rpm at 135° C. The oil heated kneader 350, 287 cm³ with walzenkneaders W7646 was used. The time to increase the torque value by 10 Nm ($T_{10}$) from the minimum value ($E_{min}$) was measured.

It is evident from Table 7 that the insulating composition according to this example has a good scorch performance.

The $T_{10}$ time of 62 min should be compared with about 56 min for conventional crosslinkable LDPE. Also, the hot set equation was good.

TABLE 6

| First reactor (PP1) | |
|---|---|
| Temperature (° C.) | 85 |
| Pressure (MPa) | 6.1 |
| Ethylene concentration (MPa) | 0.70 |
| Hydroqen concentration (mol/kmol $C_2$) | 122 |
| 1-butene concentration (mol/kmol $C_2$) | 510 |
| Product density g/cm$^3$) | 0.942 |
| $MFR_2$ (g/10 min) | 115 |
| Second reactor (PR2) | |
| Temperature (° C.) | 75 |
| Pressure (MPa) | 2.0 |
| Ethylene concentration (bar) | 1.9 |
| Hydrogen concentration (mol/kmol $C_2$) | 135 |
| 1-butene concentration (mol/kmol $C_2$) | 560 |
| Split (product ratio PrePR:PR1:PR2) | 1:44:55 |
| End product | |
| Product density (g/cm$^3$) | 0.924 |
| $MFR_2$ (g/10 min) | 6.2 |
| MWD | 5.5 |
| Melting temperature (° C.) | 124 |
| Comonomer content (% by weight) | 8.9 |
| Degree of unsaturation (C=C/1000C) | 0.39 |
| Apparent viscosity (Pa.s) at 135° C. | |
| Shear rate: 10 s$^{-1}$ | 2790 |
| Shear rate: 100 s$^{-1}$ | 1120 |
| Shear rate: 1000 s$^{-1}$ | 280 |

TABLE 7

| Elongation/Set (%/%) | 57/0 |
|---|---|
| Gel content (%) | 71 |
| Scorch $T_{10}$ min | 62 |
| Scorch $F_{min}$ (nm) | 28 |

COMPARATIVE EXAMPLES 9–10

For the polymerisation of ethylene a loop reactor and a gas-phase reactor connected in series were used together with a prepolymerisation reactor (Prc PR). In addition to ethylene 1-butene was used as a comonomer in the loop reactor and the gas-phase reactor. Hydrogen was used as a modifier. The catalyst was a catalyst of Ziegler-Natta type and was added to the prepolymerisation reactor. Propane was used as a reaction medium in the loop reactor. The gaseous components of the product from the loop reactor were removed in a flash tank, whereafter the product was transferred to the gas-phase reactor where the polymerisation was continued. The polymerisation conditions and the product properties are shown i Table 8.

After compounding the copolymer with 0.2% by weight of Santonox R (a stabiliser), and adding 2.0% by weight of dicumyl peroxide (crosslinking agent) the crosslinking properties of the insulating composition were evaluated by the hot set test. In the hot set test, the elongation of dumbbells was measured at 200° C. with a load of 0.2 MPa. Decaline extraction was performed ASTM D 2765. The results are given in Table 9.

Table 9 also shows the results of scorch-testing. The measurements were performed on a Brabender Plasticorder PL 2000-6 at 5 rpm at 135° C. The oil heated kneader 350, 287 cm$^3$ with walzenkneaders W7646 was used. The time to increase the torque value by 10 Nm ($T_{10}$) from the minimum value ($F_{min}$) was measured.

It is evident from Table 9 that the insulating compositions according to this example which have too high viscosities are somewhat scorch sensitive. The $T_{10}$ times of 26 min and 34 min should be compared with about 56 min for conventional crosslinkable LDPE. The hot set elongation was good.

TABLE 8

| First reactor (PR1) | Example 9 | Example 10 |
|---|---|---|
| Temperature (° C.) | 85 | 85 |
| Pressure (MPa) | 6.1 | 6.1 |
| Ethylene concentration (MPa) | 0.65 | 0.66 |
| Hydrogen concentration (mol/kmol $C_2$) | 142 | 145 |
| 1-butene concentration (mol/kmol $C_2$) | 630 | 707 |
| Product density (g/cm$^3$) | 0.943 | 0.940 |
| $MFR_2$ (g/10 min) | 230 | 206 |
| Second reactor (PR2) | | |
| Temperature (° C.) | 75 | 75 |
| Pressure (MPa) | 2.0 | 2.0 |
| Ethylene concentration (MPa) | 1.57 | 1.60 |
| Hydrogen concentration (mol/kmol $C^2$) | 30 | 29 |
| 1-butene concentration (mol/kmol $C^2$) | 500 | 685 |
| Split (product ratio PrePR:PR1:PR2) | 1:42:57 | 1:42:57 |
| End product | | |
| Product density (g/cm$^3$) | 0.926 | 0.920 |
| $MFR_2$ (g/10 min) | 0.53 | 0.82 |
| MWD | 11.3 | 9.9 |
| Melting temperature (° C.) | 122 | 122 |
| Comonomer content (% by weight) | 7.7 | 10.1 |
| Degree of unsaturation (C=C/1000C) | 0.27 | 0.33 |
| Apparent viscosity (Pa.s) at 135° C. | | |
| Shear rate: 10 s$^{-1}$ | 7900 | 7200 |
| Shear rate: 100 s$^{-1}$ | 1900 | 1800 |
| Shear rate: 1000 s$^{-1}$ | 360 | 384 |

TABLE 9

| | Example 9 | Example 10 |
|---|---|---|
| Elongation/Set (%/%) | 31/−1 | 46 |
| Gel content (%) | 79.6 | 73.2 |
| Scorch $T_{10}$ min | 26 | 34 |
| Scorch $F_{min}$ (nm) | 01 | 56 |

What is claimed is:

1. An insulating composition for an electric power cable which comprises a crosslinkable, multimodal ethylene copolymer obtained by coordination catalysed polymerisation with a single site catalyst of ethylene and at least one other alpha-olefin, said multimodal ethylene copolymer
   i) having a density of 0.890–0.940 g/cm$^3$
   ii) having an $MFR_2$ of 0.1–10 g/10 min,
   iii) having an MWD of 3–12,
   iv) being completely melted at 125° C., and
   v) having a viscosity of
      2500–7000 Pa.s at 135° C. and a shear rate of 10 s$^{-1}$,
      1000–1800 Pa.s at 135° C. and a shear rate of 100 s$^{-1}$, and
      250–400 Pa.s at 135° C. and a shear rate of 1000 s$^{-1}$,
said multimodal ethylene copolymer including an ethylene copolymer fraction selected from (a) a low molecular weight ethylene copolymer having a density of 0.900–0.950 g/cm$^3$ and an $MFR_2$ of 25–300 g/10 min, and (b) a high molecular weight ethylene copolymer having a density of 0.870–0.940 g/cm$^3$ and an $MFR_2$ of 0.01–3 g/10 min.

2. An insulating composition as claimed in claim 1, wherein the comonomer of the copolymer is at least one member selected from the group consisting of propylene, 1-butene, 4-methyl-1-pentene, 1-hexene, and 1-octene.

3. An insulating composition as claimed in claim 1, wherein the MWD is 4–10.

4. An insulating composition as claimed in claim 1, wherein the MWD is 4–8.

5. An insulating composition as claimed in claim 1, wherein the multimodal ethylene copolymer is a bimodal ethylene copolymer comprising 30–60% by weight of a low molecular weight ethylene copolymer fraction and 70–40% by weight of a high molecular weight ethylene copolymer fraction.

6. An insulating composition as claimed in claim 1, wherein the multimodal ethylene copolymer includes a low molecular weight ethylene copolymer fraction having a density of 0.900–0.950 g/cm$^3$ and a MFR$_2$ of 25–300 g/10 min.

7. An insulating composition as claimed in claim 1, wherein the multimodal ethylene copolymer includes a high molecular weight ethylene copolymer fraction having a density of 0.870–0.940 g/cm3 and a MFR$_2$ of 0.01–3 g/10 min.

8. An insulating composition as claimed in claim 1, wherein the low molecular weight ethylene copolymer fraction has a MFR$_2$ of 40–200 g/10 min.

9. An insulating composition as claimed in claim 8, wherein the low molecular weight ethylene copolymer fraction has a MFR$_2$ of 50–100 g/10 min.

10. An electric power cable comprising a conductor surrounded by an inner semiconductor layer, an insulating layer, and an outer semiconducting layer, said insulating layer including a crosslinked multimodal ethylene copolymer obtained by coordination catalysed polymerisation with a single site catalyst of ethylene and at least one other alpha-olefin and
  i) having a density of 0.890–0.940 g/cm$^3$,
  ii) having an MFR$_2$ of 0.1–10 g/10 min,
  iii) having an MWD of 3–12,
  iv) being completely melted at 125° C., and
  v) having a viscosity of
    2500–7000 Pa.s at 135° C. and a shear rate of 10 s$^{-1}$,
    1000–1800 Pa.s at 135° C. and a shear rate of 100 s$^{-1}$, and
    250–400 Pa.s at 135° C. and a shear rate of 1000 s$^{-1}$,
said multimodal ethylene copolymer including an ethylene copolymer fraction selected from (a) a low molecular weight ethylene copolymer having a density of 0.900–0.950 g/cm$^3$ and an MFR$_2$ of 25–300 g/10 min, and (b) a high molecular weight ethylene copolymer having a density of 0.870–0.940 g/cm$^3$ and an MFR$_2$ of 0.01–3 g/10 min.

* * * * *

UNITED STATES PATENT AND TRADEMARK OFFICE
CERTIFICATE OF CORRECTION

PATENT NO. : 6,369,129 B1
DATED : April 9, 2002
INVENTOR(S) : Martensson et al.

It is certified that error appears in the above-identified patent and that said Letters Patent is hereby corrected as shown below:

<u>Title page,</u>
Insert -- [30] Foreign Application Priority Data

January 2, 1998       Sweden       9800001-1 --

Signed and Sealed this

Twenty-first Day of January, 2003

JAMES E. ROGAN
*Director of the United States Patent and Trademark Office*